(12) United States Patent
Kamiwada

(10) Patent No.: US 8,996,313 B2
(45) Date of Patent: Mar. 31, 2015

(54) INFORMATION PROCESSING APPARATUS, INFORMATION PROCESSING METHOD, AND ELECTRONIC DEVICE

(75) Inventor: Toru Kamiwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 554 days.

(21) Appl. No.: 13/403,453

(22) Filed: Feb. 23, 2012

(65) Prior Publication Data

US 2012/0253674 A1 Oct. 4, 2012

(30) Foreign Application Priority Data

Mar. 31, 2011 (JP) ................................. 2011-080471

(51) Int. Cl.
G06F 19/00 (2011.01)
H04W 24/00 (2009.01)
G01C 21/12 (2006.01)
G01C 21/20 (2006.01)
G01C 5/06 (2006.01)

(52) U.S. Cl.
CPC ............... G01C 21/206 (2013.01); G01C 5/06 (2013.01)
USPC ............................ 702/3; 455/456.1; 701/434

(58) Field of Classification Search
CPC ........ G01C 21/206; G01C 21/32; G01C 5/06; G01F 2221/2111; G01S 5/0027; G01S 5/0036; G01S 5/0045; H04L 67/18; H04L 67/22; H04M 2242/30; H04W 4/02; H04W 4/023; H04W 4/025; H04W 4/043; H04W 4/04
USPC ...................... 702/3, 94, 138, 150, 182, 189; 455/404.2, 456.1, 456.3, 456.5–456.6, 455/457; 342/357.23, 357.34; 701/434, 454
See application file for complete search history.

(56) References Cited

FOREIGN PATENT DOCUMENTS

| JP | 2001-245027 | 9/2001 |
| JP | 2004-32580 | 1/2004 |
| JP | 2008-14742 | 1/2008 |

OTHER PUBLICATIONS

Wang et al., Fusion of Barometric Sensors, WLAN Signals and Building Information for 3-D Indoor/Campus Localization, 206, Proceedings of International Conference on Multisensor Fusion and Integration for Intelligent Systems (MFI 206), 7 pp.*
Abstract of Wang et al. reference, 2006, 1 pp.*

* cited by examiner

Primary Examiner — Toan Le
(74) Attorney, Agent, or Firm — Staas & Halsey LLP

(57) ABSTRACT

An apparatus includes an obtaining unit configured to obtain an atmospheric-pressure value measured by each of a plurality of electronic devices, the plurality of electronic devices being located at corresponding floors in a building and having atmospheric-pressure sensors, respectively, a setting unit configured to perform processing, the processing including calculating a frequency of an atmospheric-pressure value having a same value on the basis of the obtained plurality of atmospheric-pressure values and, classifying the atmospheric-pressure values on the basis of the frequencies, and generating association information associating the classified atmospheric-pressure value with a floor of the building; and a transmission unit configured to transmit information on a floor of the building associated with the atmospheric-pressure value on the basis of the generated association information when an atmospheric-pressure value is received together with identification information identifying the electronic device from any one of the electronic devices.

13 Claims, 21 Drawing Sheets

FIG. 7

| INFORMATION TYPE | TERMINAL ID | ATMOSPHERIC-PRESSURE-SENSOR VALUE | LOCATION INFORMATION |
|---|---|---|---|
| PERIODIC NOTIFICATION | 0591 | 1008.45hPa | LAT +35.3324<br>LNG +134.549 |

FIG. 9

| INFORMATION TYPE | TERMINAL ID | BUILDING NAME | FLOOR NUMBER |
|---|---|---|---|
| FLOOR-NUMBER RESPONSE | 0665 | A BUILDING | FOURTH FLOOR |

FIG. 10

LOCATION IDENTIFICATION RESULT

YOU ARE ON THE FOURTH FLOOR
OF A BUILDING NOW.

| TERMINAL ID (100a) | ATMOSPHERIC-PRESSURE-SENSOR VALUE (100b) | LOCATION INFORMATION (100c) | RECEIVED TIME (100e) |
|---|---|---|---|
| 0591 | 1008.45hPa | LAT + 35.3324<br>LNG + 134.5549 | 10/15/2010 18:00:00 |
| 0462 | 1007.20hPa | LAT + 35.5832<br>LNG + 134.6653 | 10/15/2010 18:05:00 |
| 0472 | 1006.75hPa | LAT + 36.6683<br>LNG + 135.2588 | 10/15/2010 18:07:05 |
| | | | |

| BUILDING NAME (101a) | LATITUDE (LAT) (101b) | | LONGITUDE (LNG) (101c) | |
|---|---|---|---|---|
| | LOWER LIMIT (101b1) | UPPER LIMIT (101b2) | LOWER LIMIT (101c1) | UPPER LIMIT (101c2) |
| A BUILDING (10171) | +35.3323 | +35.3325 | +135.5548 | +135.5550 |
| B BUILDING (10172) | +35.3321 | +35.3325 | +135.5551 | +135.5554 |
| H BUILDING (10173) | +35.3322 | +35.3325 | +135.5558 | +135.5558 |

FIG. 20

| BUILDING NAME | FLOOR NUMBER | ATMOSPHERIC-PRESSURE UPPER LIMIT VALUE | ATMOSPHERIC-PRESSURE LOWER LIMIT VALUE |
|---|---|---|---|
| A BUILDING | FIRST FLOOR | 1008.00hPa | 1008.20hPa |
| | SECOND FLOOR | 1008.25hPa | 1008.45hPa |
| | THIRD FLOOR | 1008.50hPa | 1008.70hPa |
| | FOURTH FLOOR | 1008.75hPa | 1008.95hPa |

INFORMATION PROCESSING APPARATUS, INFORMATION PROCESSING METHOD, AND ELECTRONIC DEVICE

CROSS-REFERENCE TO RELATED APPLICATIONS

This application is based upon and claims the benefit of priority of the prior Japanese Patent Application No. 2011-080471, filed on Mar. 31, 2011, the entire contents of which are incorporated herein by reference.

FIELD

The embodiment discussed herein is related to an information processing apparatus, an information processing method, and an electronic device.

BACKGROUND

In recent years, electronic devices, such as mobile phones, etc., have become equipped with a measuring device, such as a location identification unit using a GPS (Global Positioning System), etc., and an atmospheric-pressure sensor for measuring an atmospheric pressure, etc.

For these devices, there are demands for identifying an altitude of the current place and a floor number of a building using the atmospheric-pressure sensor. However, atmospheric pressure is changing any time because of a change in the weather, and thus it is not possible to identify an altitude and a floor number in a building directly from a value of an atmospheric pressure (hereinafter referred to as an atmospheric pressure).

Accordingly, to date, the current altitude and a floor number of an electronic device have been identified by the following method.

That is to say, a dedicated atmospheric sensor is disposed at a reference location whose altitude is known in advance. And an electronic device obtains the current atmospheric pressure value of the dedicated atmospheric-pressure sensor through communication, and then obtains the difference between an atmospheric pressure value of an atmospheric-pressure sensor attached to the electronic device and the current atmospheric pressure value. Thereby, the altitude is obtained by calculating the difference in altitude from that at the reference location. In a related-art technique, in order to identify a floor number of a building, conversion processing from the obtained altitude to the floor number is performed in addition.

Japanese Laid-open Patent Publication No. 2001-245027 is an example of related art.

SUMMARY

According to an aspect of the invention, an apparatus includes an obtaining unit configured to obtain an atmospheric-pressure value measured by each of a plurality of electronic devices, the plurality of electronic devices being located at corresponding floors in a building and having atmospheric-pressure sensors, respectively, a setting unit configured to perform processing, the processing including calculating a frequency of an atmospheric-pressure value having a same value on the basis of the obtained plurality of atmospheric-pressure values and, classifying the atmospheric-pressure values on the basis of the frequencies, and generating association information associating the classified atmospheric-pressure value with a floor of the building; and a transmission unit configured to transmit information on a floor of the building associated with the atmospheric-pressure value on the basis of the generated association information when an atmospheric-pressure value is received together with identification information identifying the electronic device from any one of the electronic devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 7 is a diagram illustrating periodic notification information according to the present embodiment.

FIG. 9 is a diagram illustrating a response according to the present embodiment.

FIG. 10 is a diagram illustrating a location identification result displayed on the mobile phone according to the present embodiment.

FIG. 12 is a diagram illustrating storage information stored in an atmospheric-pressure-sensor value storage unit according to the present embodiment.

FIG. 15 is a diagram illustrating building location information stored in a building-location information storage unit according to the present embodiment.

FIG. 20 is a diagram illustrating atmospheric-pressure-range information according to the present embodiment.

DESCRIPTION OF EMBODIMENT

Figure 1:
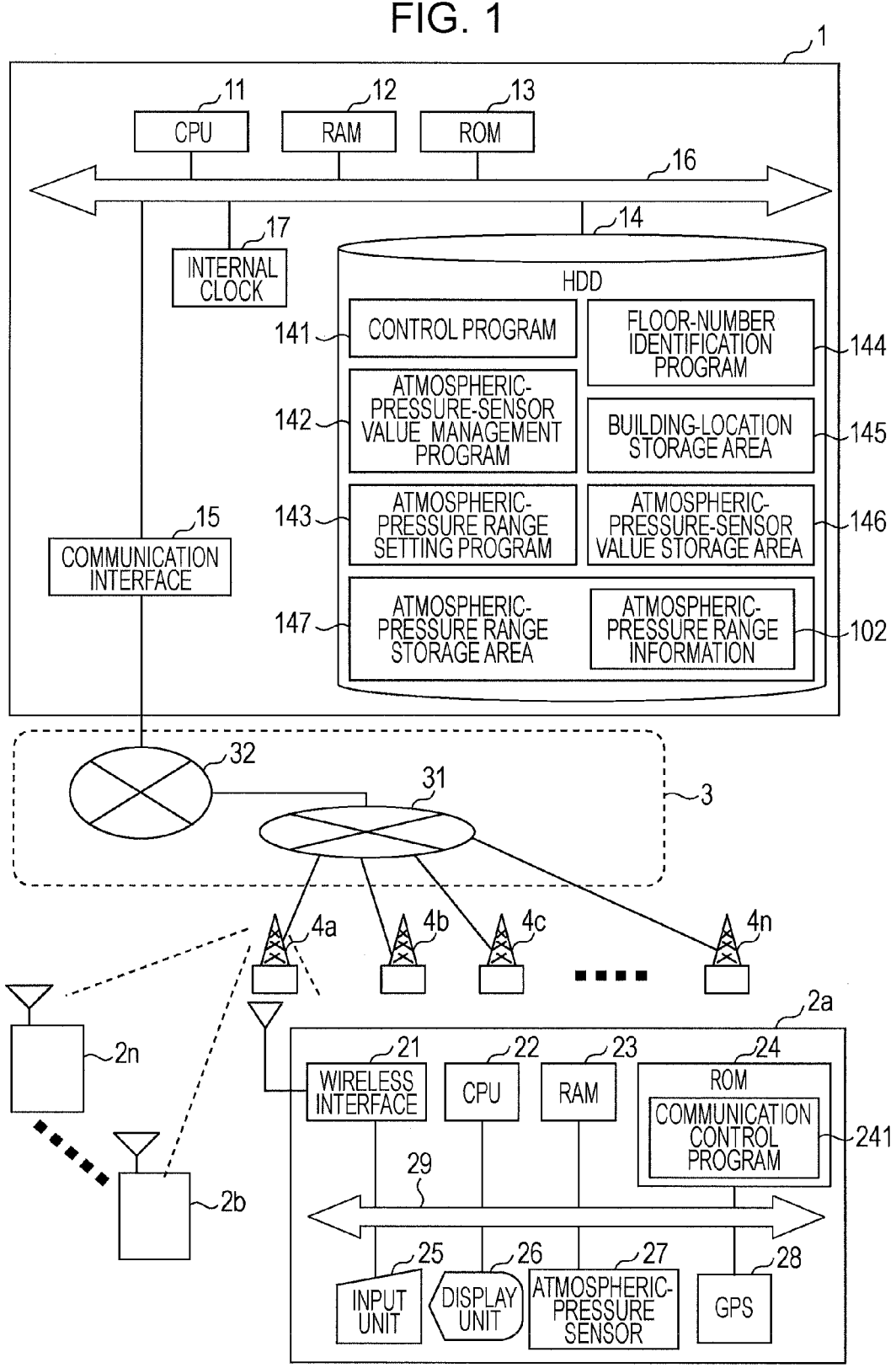
FIG. 1 is a hardware diagram of an information processing system according to the present embodiment.

FIG. 1 is a hardware diagram of an information processing system according to the present embodiment.

The information processing system according to the present embodiment has a server 1, which is one kind of information processing apparatuses, a plurality of mobile phones 2a to 2n, which are kinds of electronic devices, a network 3, and base stations 4a to 4n, which perform relaying communication between the mobile phones 2a to 2n and the network 3.

Among these, the server 1 has a CPU (Central Processing Unit) 11, a RAM (Random Access Memory) 12, a ROM (Read Only Memory) 13, and an HDD (Hard Disk Drive) 14. Further, the server 1 has a communication interface 15 performing communication with the mobile phones 2a to 2n through the network 3 and the base stations 4a to 4n, etc., and an internal clock 17.

Also, the CPU 11, the RAM 12, the ROM 13, the HDD 14, the communication interface 15, and the internal clock 17 are connected through a bus 16.

The HDD 14 stores various programs including a control program 141, an atmospheric-pressure-sensor value management program 142, an atmospheric-pressure-range setting program 143, and a floor number identification program 144.

The CPU 11 performs these programs stored in the HDD 14 so as to access the RAM 12, the ROM 13, and the HDD 14, and to control the communication interface 15 in order to achieve various functions.

Also, the HDD 14 has a building-location storage area 145, which stores location information of a building, an atmospheric-pressure-sensor value storage area 146, which stores atmospheric-pressure values from the mobile phones 2a to 2n, and an atmospheric-pressure-range storage area 147, which stores atmospheric-pressure-range information 102, in addition to the above-described various programs.

Also, the mobile phone 2a has a wireless interface 21 performing communication with the server 1 through the base stations 4a to 4n, and the network 3. Further, the mobile phone 2a has a CPU (Central Processing Unit) 22, a RAM (Random Access Memory) 23, and a ROM (Read Only Memory) 24. Further, the mobile phone 2a has an input unit 25, such as a keyboard, etc., a display unit 26, such as an LCD (Liquid Crystal Display), etc., an atmospheric-pressure sensor 27, and a GPS (Global Positioning System) 28. Also, individual components of the mobile phone 2a are connected through a bus 29. Also, the CPU 11 executes a communication control program 241 in the ROM 24 so as to achieve various functions.

In this regard, the mobile phones 2b to 2n have the same components as those of the mobile phone 2a described above.

The network 3 is achieved by connecting a mobile phone network 31 to which the base stations 4a to 4n are connected, and a wide area network 32, such as the Internet, etc., to which the server 1 is connected.

As described above, the server 1 achieves various functions by the CPU 11 performing various programs in the HDD 14, and the mobile phones 2a to 2n achieve various functions by the CPU 22 performing the communication control program 241 in the ROM 24.

Figure 2:
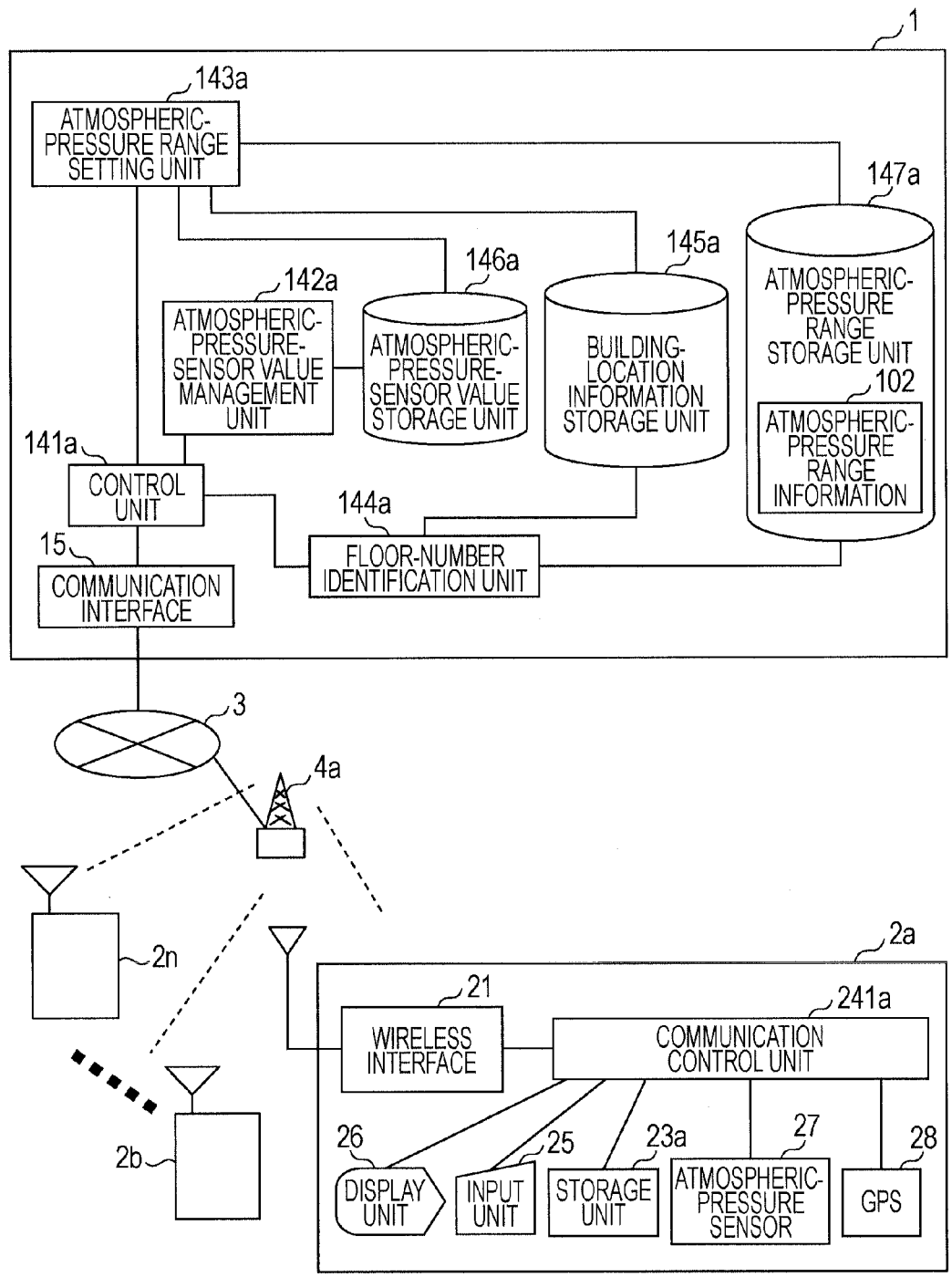
FIG. 2 is a functional block diagram of the information processing system according to the present embodiment.

A functional block diagram at the time of achieving these various functions is illustrated in FIG. 2.

First, a description will be given of the server 1. In this regard, the building-location-information storage area 145, the atmospheric-pressure-sensor value storage area 146, and the atmospheric-pressure-range storage area 147 in the HDD 14 are stored in the HDD 14, which is one piece of hardware, function as individual storage units, respectively. Thus, in FIG. 2, a description will be given on the assumption that the building-location-information storage area 145, the atmospheric-pressure-sensor value storage area 146, and the atmospheric-pressure-range storage area 147 are described as a building-location-information storage unit 145a, an atmospheric-pressure-sensor value storage unit 146a, and an atmospheric-pressure-range storage unit 147a, respectively.

In the server 1, when the CPU 11 executes the control program 141, the CPU 11 functions as a control unit 141a controlling the entire server 1. Also, when the CPU 11 executes the atmospheric-pressure-sensor value management program 142, the CPU 11 functions as an atmospheric-pressure-sensor value storage unit 142a storing atmospheric-pressure-sensor values sent from the mobile phones 2a to 2n into the atmospheric-pressure-sensor value storage unit 146a.

Further, when the CPU 11 executes the atmospheric-pressure-range setting program 143, the CPU 11 functions as an atmospheric-pressure-range setting unit 143a, which refers to the atmospheric-pressure-sensor value storage unit 146a and the building-location-information storage unit 145a, sets an atmospheric-pressure range for each building, and stores the atmospheric-pressure range into the atmospheric-pressure-range storage unit 147a.

In addition, when the CPU 11 executes the floor-number identification program 144, if a floor-number identification request is received from any one of the mobile phones 2a to 2n, the CPU 11 functions as a floor-number identification unit 144a identifying a floor of the mobile phone (any one from the mobile phones 2a to 2n).

Next, a description will be given of the mobile phone 2a. The CPU 22 in the mobile phone 2a executes the communication control program 241 in the ROM 24 so as to function as a communication control unit 241a. At this time, the RAM 23 functions as a storage unit 23a for storing various kinds of data.

As described above, the mobile phones 2b to 2n have the same components as those of the mobile phone 2a, and thus it is assumed that the same functions are performed in the individual mobile phones 2b to 2n.

Also, in the present embodiment, in order to simplify the explanation, a description will be given of the mobile phones 2a to 2n communicating through the base station 4a among the base stations 4a to 4n. However, in reality, communication using the other base stations 4a to 4n is not inhibited.

Further, FIG. 1 is a hardware configuration diagram, and thus a description has been given of the inside of the network 3. However, in the present embodiment, unless otherwise needed, a description will be given as the network 3.

Next, a description will be given of a principle of obtaining an atmospheric-pressure range of a building from the atmospheric-pressure-sensor values obtained by the individual mobile phones 2a to 2n in the present embodiment using the schematic diagrams in FIG. 3 and FIG. 4.

In this regard, the mobile phones 2a to 2n are too many, and thus in the following description, a description will be given using a generic name, a mobile phone 2 when naming all the mobile phones 2a to 2n generically.

Figure 3:
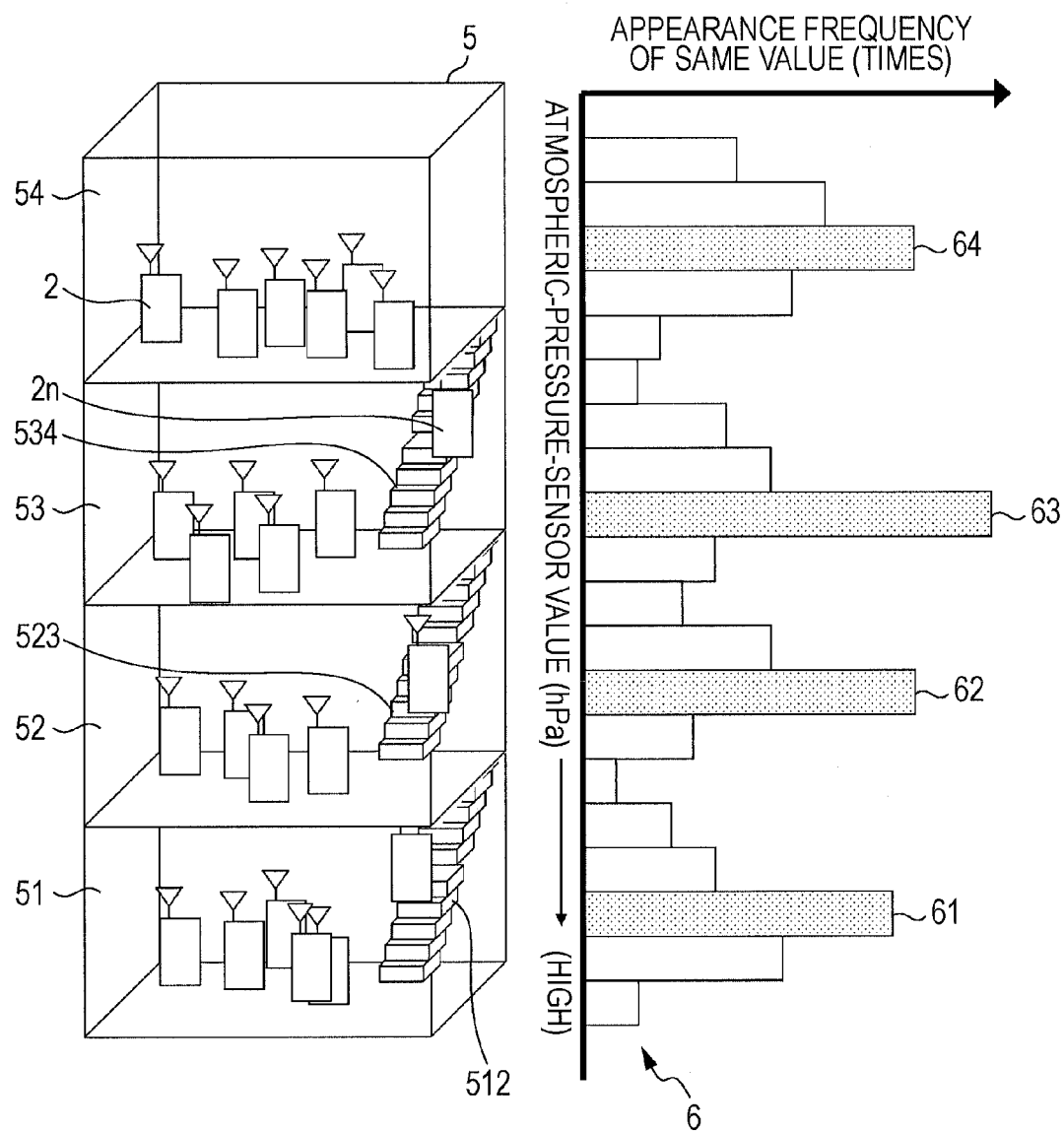
FIG. 3 is a schematic diagram illustrating a principle of obtaining an atmospheric-pressure range of a building according to the present embodiment.
Figure 4:
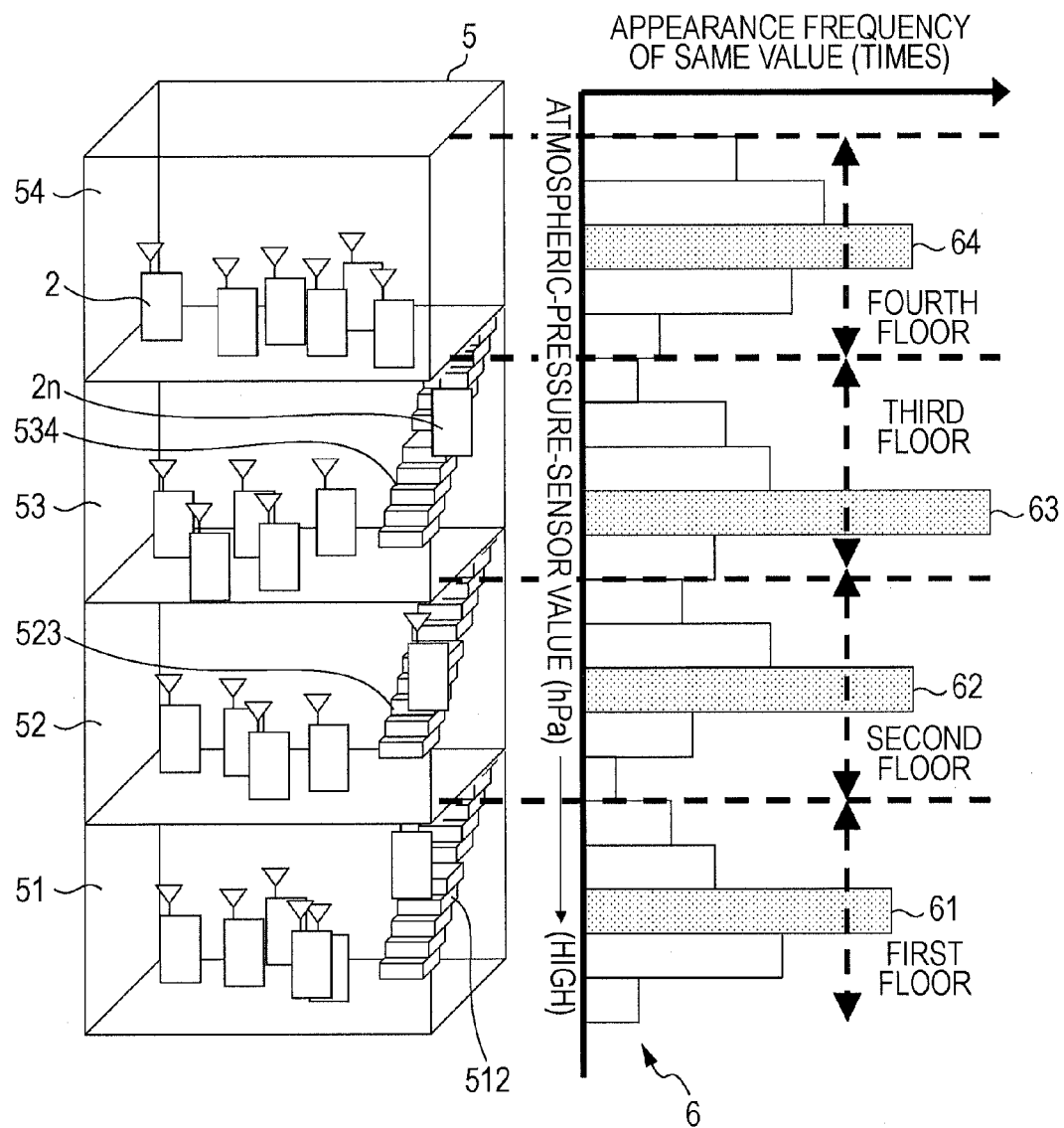
FIG. 4 is a schematic diagram illustrating a principle of obtaining an atmospheric-pressure range of a building according to the present embodiment.

FIG. 3 is an image diagram of a four-story building 5, which has a first floor 51 to a fourth floor 54. Also, between the individual floors, facilities, such as staircases 512, 523, and 534, etc., are disposed for moving up and down.

An atmospheric pressure becomes higher as an altitude becomes lower. Accordingly, an atmospheric-pressure-sensor value measured at the lowest floor, or the first floor 51 in the building 5 becomes highest. The upper the staircase is, the lower is an atmospheric-pressure-sensor value of the mobile phone 2.

Also, in general, the building 5 is designed such that a distance from a floor to a ceiling becomes higher than a person's body height. Accordingly, there is a sufficient space in the upper direction even if the person stands up.

In addition, there are a wiring space, a grounding of a floor, etc., between a ceiling of a lower floor to a floor of an upper floor. That is to say, like the mobile phone 2n in FIG. 3, there are altitude values at which no user exists unless with the exception of the staircases 512, 523, and 534, etc.

Accordingly, as illustrated by a graph 6 in FIG. 3, in atmospheric-pressure-sensor values from each mobile phone 2 of the building 5, there are values (peak values) 61 to 64 whose appearance frequency (number of times) becomes higher than those of the others for each of the floors 51 to 54.

However, a user of each mobile phone 2 is performing various activities in a state of standing, sitting, etc., while changing a vertical drop in a range of around one meter. Also, the mobile phone 2 is carried around or is disposed in various ways, for example, the mobile phone 2 is put in a breast pocket, is put in a trouser pocket, is disposed on a desk, etc., and thus a vertical drop of one meter or so arises only from those variations.

Accordingly, it is difficult for a plurality of mobile phones 2 on a same floor to obtain a completely same atmospheric-pressure-sensor value. Thus, as illustrated by the graph 6 in FIG. 3, a certain number of atmospheric-pressure-sensor values appear before and after a peak value. However, users of the mobile phones 2 moving up and down using the staircases 512, 523, and 534, etc., are a few compared with users staying on the individual floors 51 to 54. Accordingly, identification of the peak values 61 to 64 is not influenced, and thus identification of a floor number is not influenced.

In consideration of the above, in an information processing system according to the present embodiment, identification of a floor number is carried out by the following procedure. (1) Identify peak values 61 to 64 by obtaining/totaling atmospheric-pressure-sensor values of a plurality of mobile phones 2 located on the individual floors 51 to 54 of the building 5. (2) Set an atmospheric-pressure range (a range of the atmospheric-pressure-sensor value) in consideration of a permissible range on the basis of the identified peak values 61 to 64, and associate the atmospheric-pressure range values in descending order with the floor numbers in ascending order, for example a first floor, a second floor, and the like in order to classify the atmospheric-pressure values. (3) When a floor-number identification request including an atmospheric-pressure-sensor value is obtained from any one of the mobile phones 2, identify which of the atmospheric-pressure ranges includes the obtained atmospheric-pressure-sensor value.

In this manner, in an information processing system according to the present embodiment, it becomes possible to provide an information processing system capable of identifying a floor number without disposing a dedicated atmospheric-pressure sensor at a reference location and without managing information on vertical drops of various buildings.

In the following, a description will be given of specific processing for achieving the above-described principle of an information processing system according to the present embodiment.

First, a description will be given of processing performed by the mobile phone 2a using a flowchart in FIG. 5. In this regard, although processing by the mobile phones 2b to 2n is not described explicitly, the mobile phones 2b to 2n have same components as those of the mobile phone 2a as described above, and thus it is assumed that the mobile phones 2b to 2n perform the same processing as the mobile phone 2a.

The control of the mobile phone 2a is performed by the communication control unit 241a. The communication control unit 241a performs processing to periodically transmit an atmospheric-pressure value (atmospheric-pressure-sensor value) obtained by the atmospheric-pressure sensor 27 to the server 1. Specifically, this processing is performed by processing in S1001 to S1004 in FIG. 5.

That is to say, the communication control unit 241a determines whether a predetermined time period (10 minutes in the present embodiment) has passed from the previous processing (S1001). Here, if a predetermined time period has passed, the communication control unit 241a obtains an atmospheric-pressure-sensor value from the atmospheric-pressure sensor 27, and obtains a current location from the GPS 28 (S1002).

Figure 6:
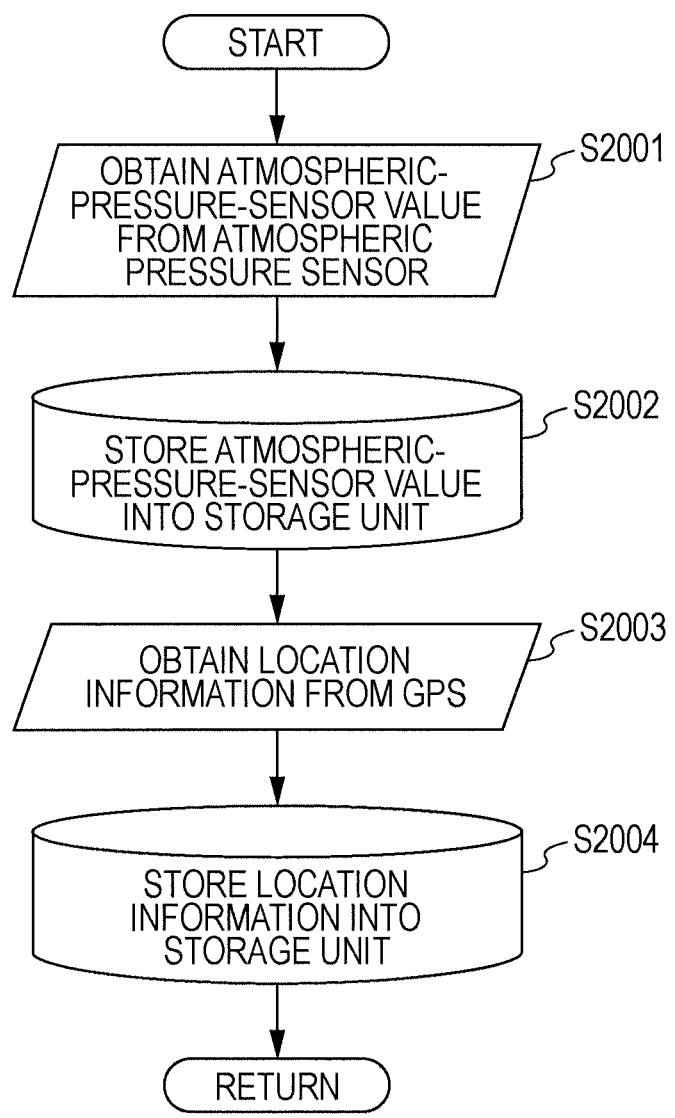
FIG. 6 is a flowchart of atmospheric-pressure sensor and location-information obtaining processing performed by the mobile phone according to the present embodiment.

In the obtaining of the values, processing based on the flowchart in FIG. 6 is performed. That is to say, the communication control unit 241a obtains an atmospheric-pressure-sensor value from the atmospheric-pressure sensor 27 (S2001), and stores the value into the storage unit 23a (S2002). And the communication control unit 241a performs processing for obtaining location information from the GPS 28 (S2003), and stores the information into the storage unit 23a (S2004). In this regard, in the present embodiment, an atmospheric-pressure-sensor value from the atmospheric-pressure sensor 27 is assumed to be a value in units of hPas (hectopascals). Further, it is assumed that location information from the GPS 28 is information indicating a LAT (latitude) and a LNG (longitude). In this regard, it is assumed that in a LAT (latitude) included in the location information of the GPS 28, "+" before a numeric value indicates a north latitude, "−" indicates a south latitude. It is assumed that in a LNG (longitude), "+" indicates an east longitude, and "−" indicates a west longitude.

Figure 5:
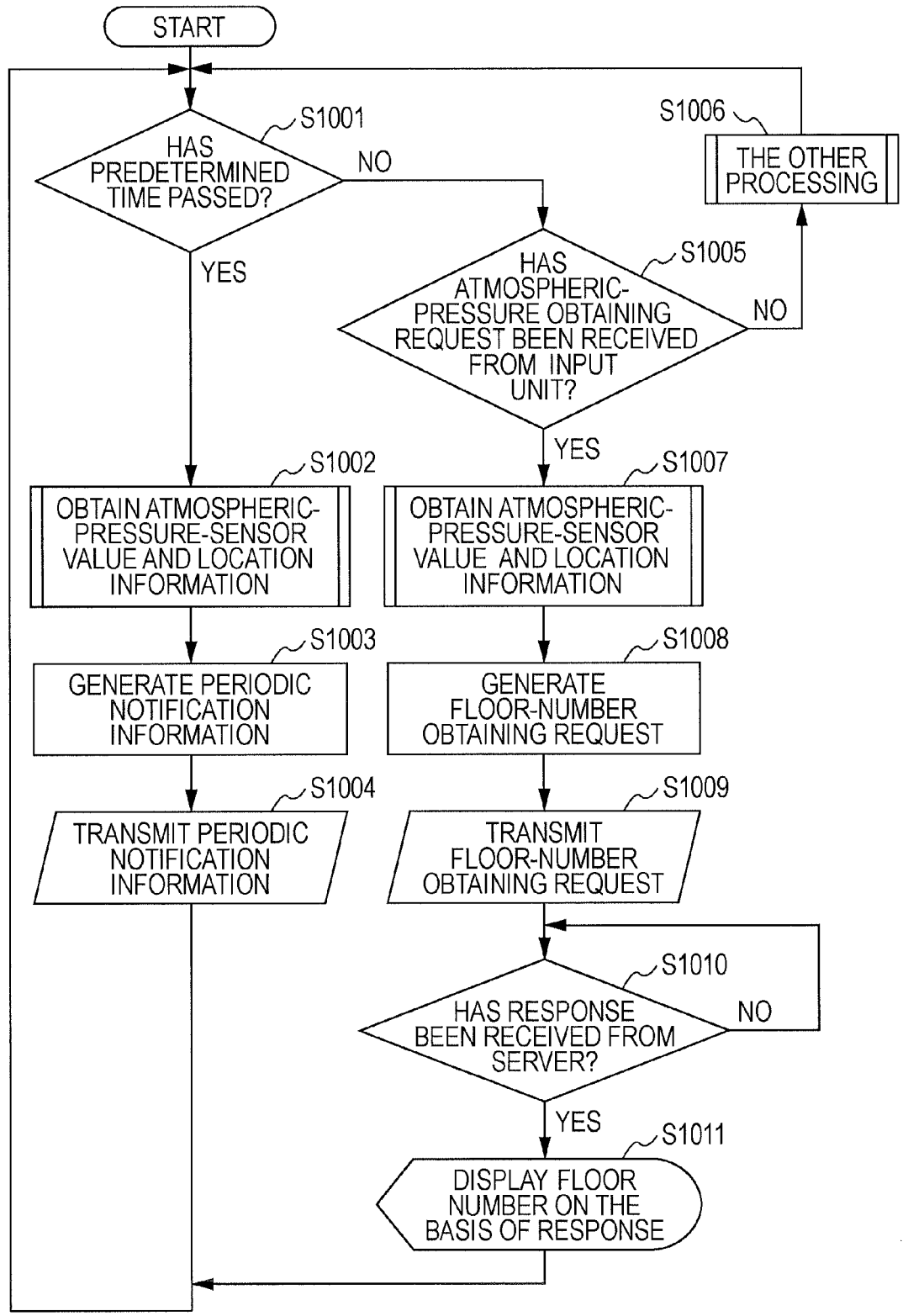
FIG. 5 is a flowchart of processing performed by a mobile phone according to the present embodiment.

Referring back to the flowchart in FIG. 5, after the communication control unit 241a obtains an atmospheric-pressure-sensor value and location information by the processing in S1002, the communication control unit 241a generates periodic notification information 220a, as illustrated in FIG. 7, to be transmitted to the server on the basis of a stored sensor value and location information stored in the storage unit 23a (S1003). As illustrated in FIG. 7, the periodic notification information 220a includes information type 220a1 to be transmitted, a terminal ID 220a2, which is identification information of a terminal, an atmospheric-pressure-sensor value 220a3, and location information 220a4. In the processing in S1003, the information type 220a1 is a "periodic notification", which indicates a periodic notification. Also, the atmospheric-pressure-sensor value 220a3 is an atmospheric-pressure-sensor value from the atmospheric-pressure sensor 27, which has been stored in the storage unit 23a by the processing in S1002. Further, the location information 220a4 is location information from the GPS 28, which has been stored in the storage unit 23a by the processing in S1002.

And the communication control unit 241a controls the wireless interface 21 to transmit the generated periodic notification information 220a to the server 1 (S1004), and the processing returns to the processing in S1001.

Also, in S1001, if determined that a predetermined time period has not passed, the communication control unit 241a determines whether there has been a request for obtaining an atmospheric pressure from the input unit 25 (S1005). That is to say, the processing in S1005 is processing for determining whether the operator has operated the input unit 25 to make a request of obtaining an atmospheric pressure 220b.

In S1005, if determined that there has been no request of obtaining an atmospheric pressure, after the communication control unit 241a proceeds to the other processing (S1006), the processing proceeds to S1001.

Also, in S1005, if determined that there has been a request for obtaining an atmospheric pressure, the communication control unit 241a performs the same processing as the processing in S1002, that is to say, obtaining processing of the atmospheric-pressure-sensor value and the location information, illustrated by the flowchart in FIG. 6 (S1007).

Figure 8:
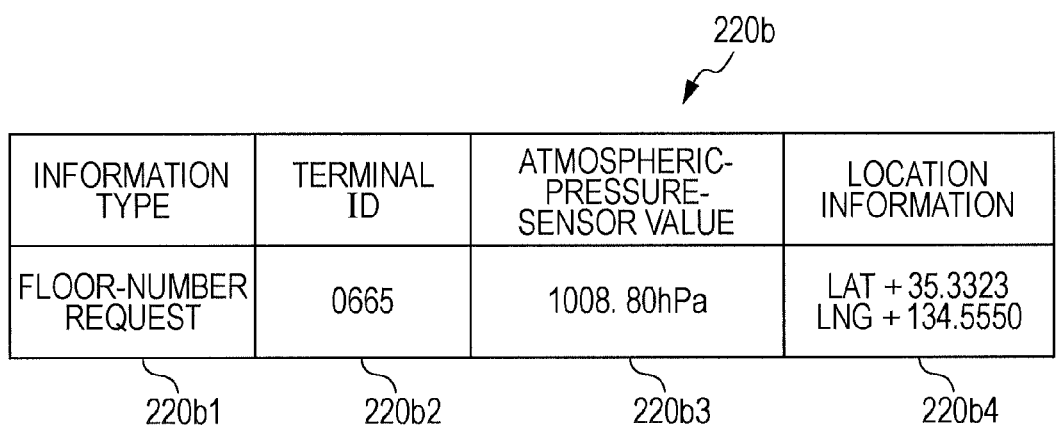
FIG. 8 is a diagram illustrating a floor-number obtaining request according to the present embodiment.

And the communication control unit 241a generates a floor-number obtaining request 220b (S1008). As illustrated in FIG. 8, the floor-number obtaining request 220b includes an information type 220b1, a terminal ID 220b2, an atmospheric-pressure-sensor value 220b3, and location information 220b4. In the case of processing in S1008, the information type 220b1 is a "floor-number request" indicating a floor-number obtaining request 220b. Also, the atmospheric-pressure-sensor value 220b3 is the atmospheric-pressure-sensor value from the atmospheric-pressure sensor 27, which has been stored in the storage unit 23a by the processing in S1007. Further, the location information 220b4 is the location information from the GPS 28, which has been stored in the storage unit 23a by the processing in S1007.

And the communication control unit 241a controls the wireless interface 21 to transmit the generated floor-number obtaining request 220b to the server 1 (S1004).

After that, the communication control unit 241a waits until reception of a response 110a to the floor-number obtaining request 220b transmitted in S1009 (S1010). If the response 110a is received from the server 1, a location identification result is displayed on the display unit 26 on the basis of the response 110a (S1011).

The response 110a received in the processing in S1010 is illustrated in FIG. 9. (In this regard, a description will be given later of generation of the response 110a by the server 1.) As illustrated in FIG. 9, the response 110a includes an information type 110a1, a terminal ID 110a2 of the mobile phone 2 that has transmitted the floor-number obtaining request 220b, a building name 110a3, and a floor number 110a4. The example in FIG. 9 illustrates that the building name 110a3 is "A building", and the floor number is the "fourth floor".

And the communication control unit 241a displays a location identification result as illustrated in FIG. 10 in the processing in S1010 on the basis of the response 110a onto the display unit 26.

In this regard, when the processing in S1010 is complete, the communication control unit 241a proceeds to the processing in S1001.

Figure 11:
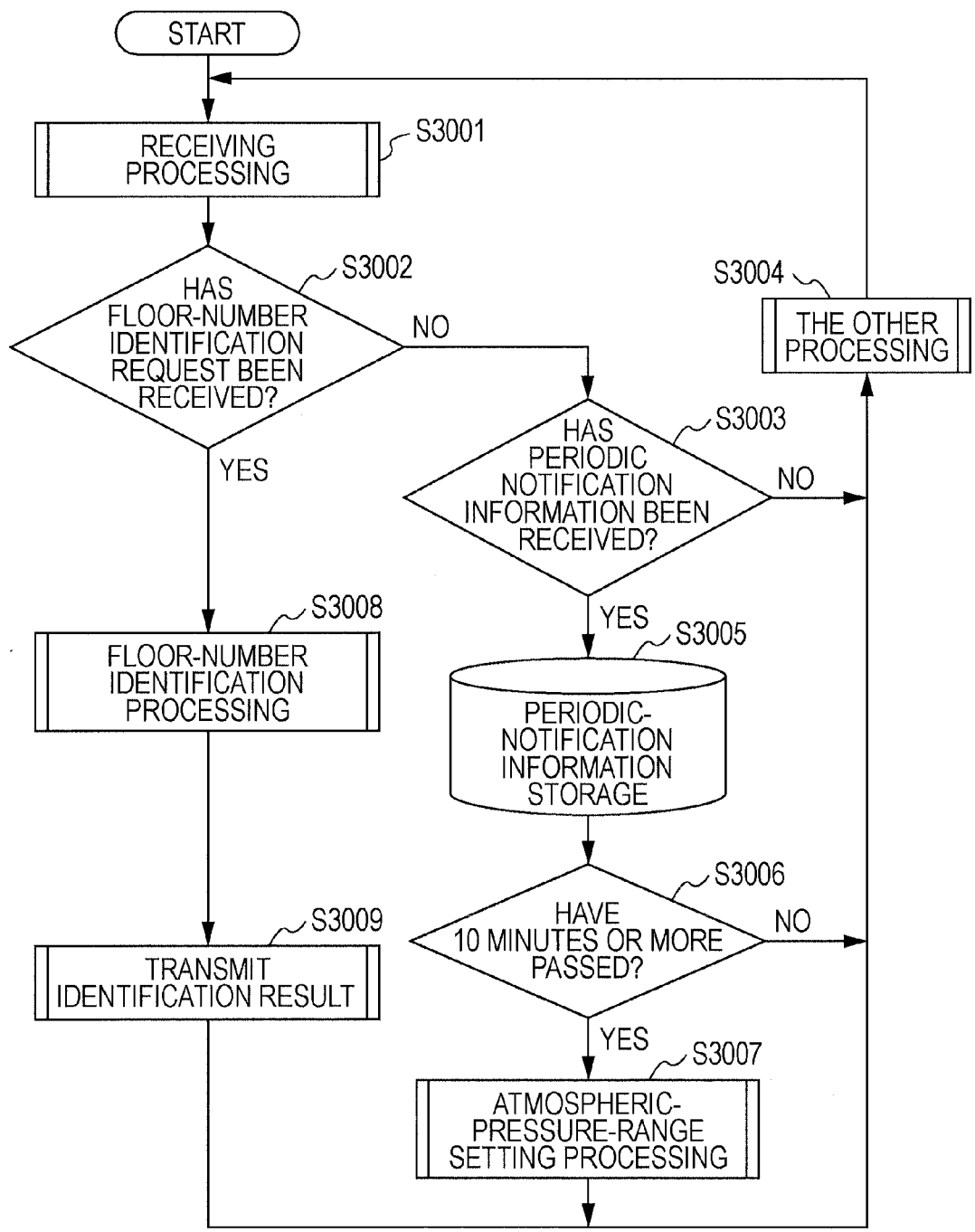
FIG. 11 is a flowchart illustrating processing of a server according to the present embodiment.

Next, a description will be given of the processing by the server 1 with reference to FIG. 11.

First, the control unit 141a of the server 1 performs receive processing of information from any one of the mobile phones 2a to 2n through the communication interface 15 (S3001).

Here, if information is received from any one of the mobile phones 2a to 2n, the control unit 141a determines whether the information indicates a floor-number identification request 220b (S3002). As described above, information transmitted from the mobile phones 2a to 2n has an "information type" as illustrated in FIG. 7 and FIG. 8. The control unit 141a determines that the information is a floor-number identification request 220b if the information type is a "floor-number request".

Here, if the control unit 141a has determined that the information is not a floor-number identification request 220b, the control unit 141a determines whether the information received by the processing in S3001 is periodic notification information 220a or not (S3003). As described above, the information transmitted from the mobile phones 2a to 2n includes an "information type" as illustrated in FIG. 7 and FIG. 8. If the information type is a "periodic notification", the control unit 141a determines that the information is periodic notification information 220a.

Here, if determined that the information is not periodic notification information 220a, the control unit 141a performs the other processing (S3004), and proceeds to the processing in S3001.

Also, in the processing in S3003, if determined that the information is periodic notification information 220a, the control unit 141a instructs the atmospheric-pressure-sensor value management unit 142a to store various kinds of information in the received periodic notification information 220a into the atmospheric-pressure-sensor value storage unit 146a (S3005). The atmospheric-pressure-sensor value management unit 141a that has received this instruction stores various kinds of information in the received periodic notification information 220a into the atmospheric-pressure-sensor value storage unit 146a.

FIG. 12 illustrates an example of information stored in the atmospheric-pressure-sensor value storage unit 146a. In the following, a description will be given on the assumption that the information stored in the atmospheric-pressure-sensor value storage unit 146a is storage information 100. As illustrated in FIG. 12, the storage information 100 includes the terminal ID 220a2 included in the received periodic notification information 220a as a terminal ID 100a, the atmospheric-pressure-sensor value 220a3 as an atmospheric-pressure-sensor value 100b, the location information 220a4 as location information 100c. And the atmospheric-pressure-sensor value management unit 142a stores received time 100e at which the periodic notification information 220a has been received together with the above-described information into the atmospheric-pressure-sensor value storage unit 146a.

Referring back to FIG. 11, when the processing in S3005 is complete, the control unit 141a determines whether 10 minutes or more have passed since the previous atmospheric-pressure range setting processing (described later) (S3006). If not passed, the processing proceeds to the processing in S3004.

In the processing in S3006, if determined that 10 minutes or more have passed, the control unit 141a instructs the atmospheric-pressure-range setting unit 143a to perform atmospheric-pressure range setting processing (S3007). The processing in S3006 and S3007 illustrates that the atmospheric-pressure range setting processing in S3007 is performed at intervals of 10 minutes.

Figure 13:
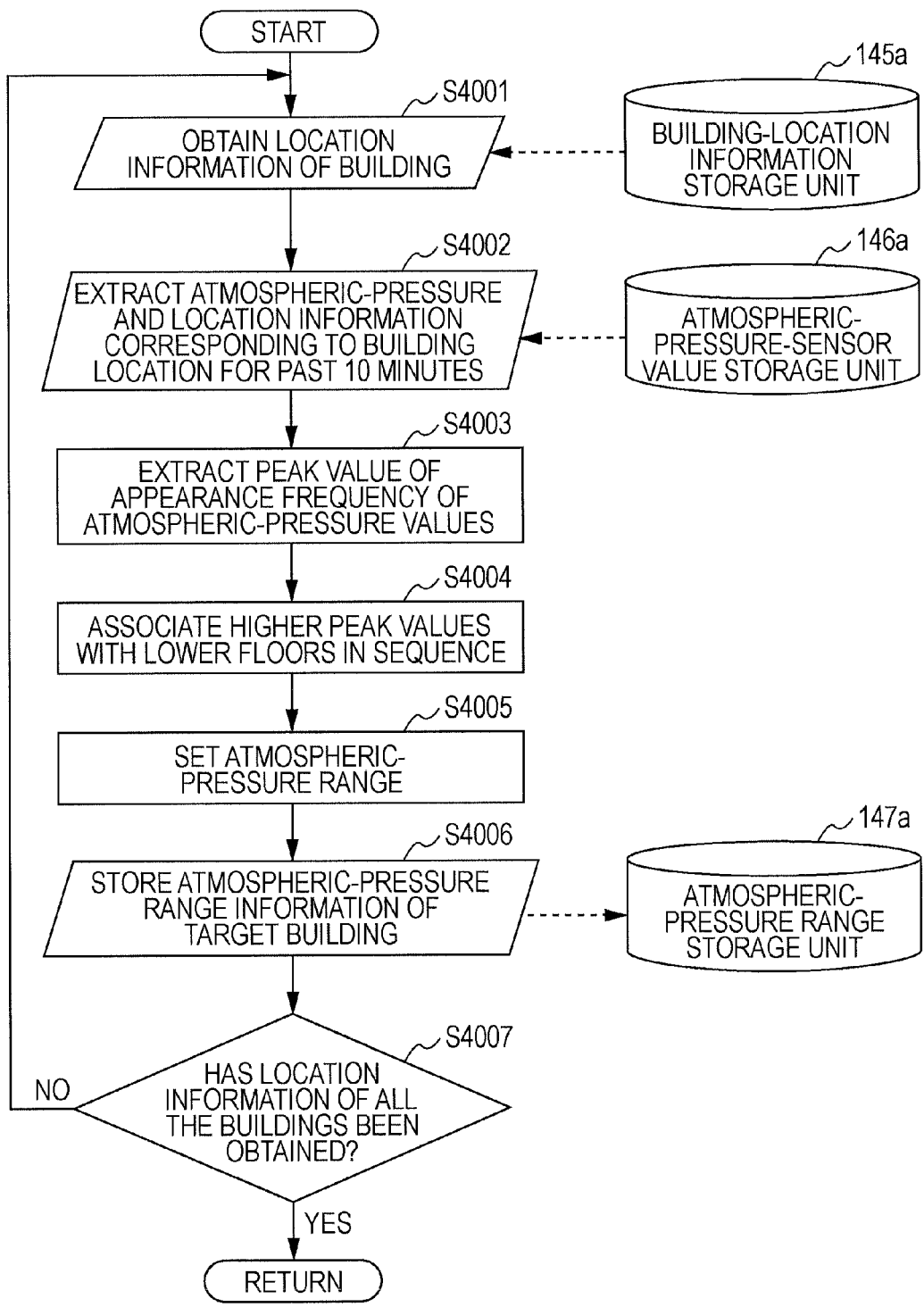
FIG. 13 is a flowchart illustrating processing of an atmospheric-pressure-range setting unit according to the present embodiment.

The atmospheric-pressure-range setting unit 143a that has received this instruction performs the processing illustrated in FIG. 13.

First, the atmospheric-pressure-range setting unit 143a refers to the building-location-information storage unit 145a, and obtains location information 101 on one building (S4001).

Figure 14:
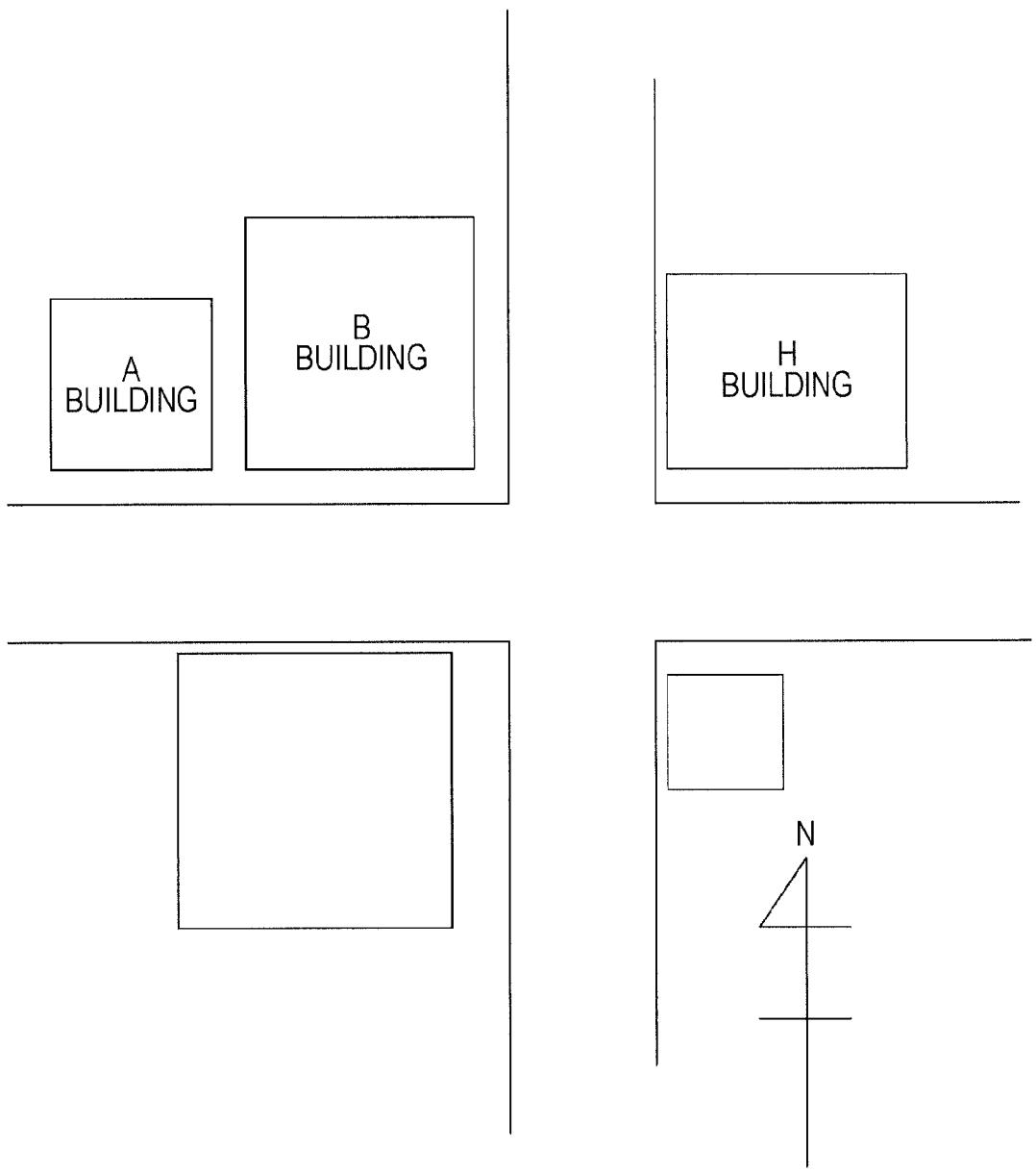
FIG. 14 is a diagram illustrating an overview of a building to be a target of the present embodiment.

For example, as illustrated in FIG. 14, a building has a certain range with reference to latitude and longitude. Thus, as illustrated in FIG. 15, the building location information 101 stored in the building-location-information storage unit 145a includes a lower limit 101b1 and an upper limit 101b2 of latitude (LAT) 101b for each building (items of 101a, 10171,

10172, and 10173). In the same manner, a lower limit 101c1 and an upper limit 101c2 are stored for a longitude (LNG) 101c of each building.

The atmospheric-pressure-range setting unit 143a obtains one of these, for example, location information 10171 on a building A in S4001 in FIG. 13.

Next, the atmospheric-pressure-range setting unit 143a refers to the storage information 100 stored in the atmospheric-pressure-sensor value storage unit 146a, and extracts an atmospheric-pressure-sensor value 100b in the past 10 minutes and corresponding to the location information 100c within a range of latitude 101b and within a range of longitude 101c included in the location information 10171 obtained in S4001 (S4002).

If the obtained time is 18:09:00, in the storage information 100 in FIG. 12, the received time information 100e and the location information 100c whose terminal ID 100a is "0591" is the corresponding one, and thus the atmospheric-pressure-sensor value "1008.45 hPa" is extracted.

And the atmospheric-pressure-range setting unit 143a totals the extracted atmospheric-pressure-sensor values for each value, and extracts a peak value of appearance frequency of atmospheric-pressure values (S4003).

Figure 16:
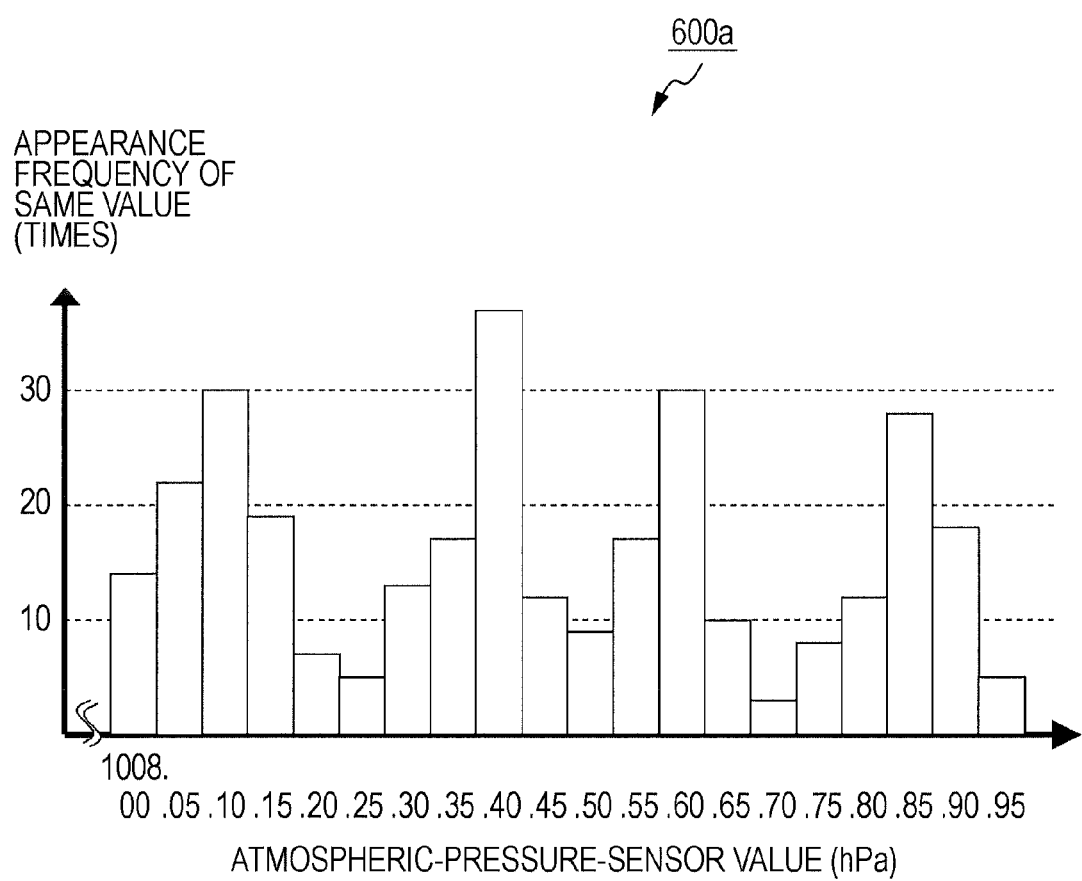
FIG. 16 is a diagram illustrating a totaled result of atmospheric-pressure-sensor values for each value extracted by the atmospheric-pressure-range setting unit according to the present embodiment.

FIG. 16 is a diagram illustrating a totaling result 600a of the atmospheric-pressure-sensor values, which have been extracted by the atmospheric-pressure-range setting unit 143a in the processing of S6003 in FIG. 13 for each value. In this regard, the atmospheric-pressure-range setting unit 143a is a function achieved by processing of the CPU 11. In reality, the totaling result is handled as numeric value information, then the information is totaled, and a graph is not made as illustrated in FIG. 16. However, in order to simplify the explanation, a description will be given using the graph of the total information.

Figure 17:
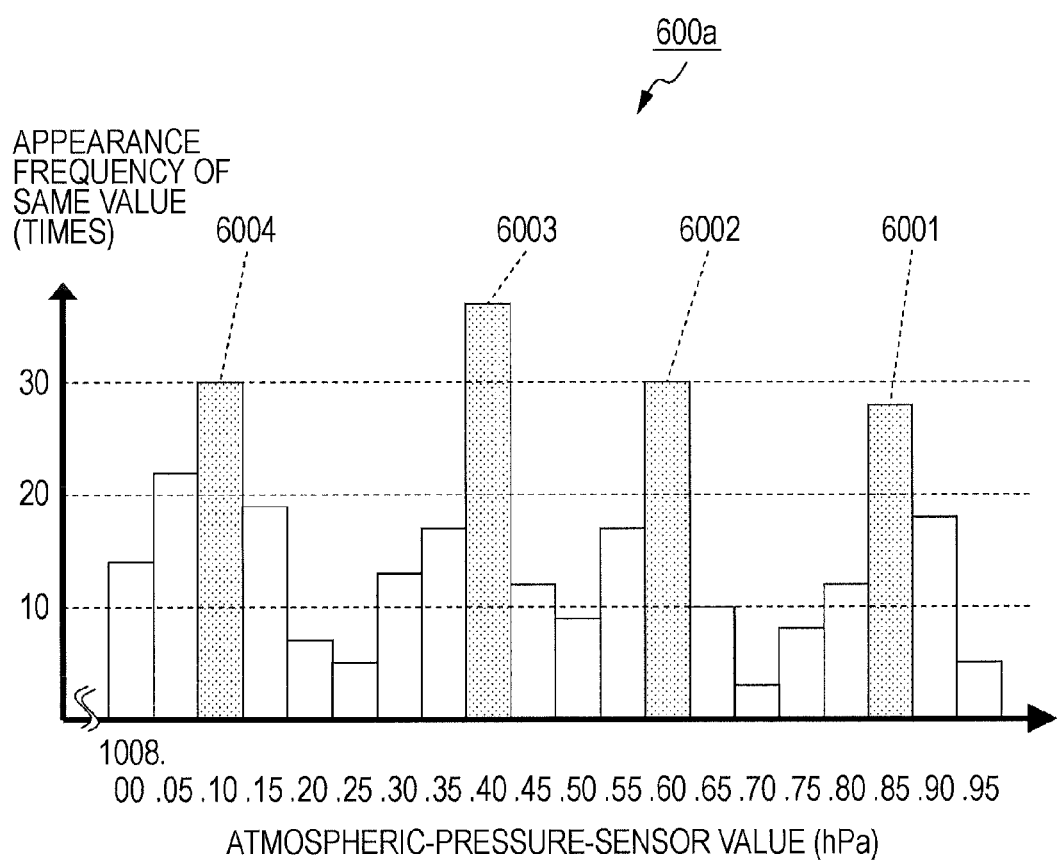
FIG. 17 is a diagram illustrating peak values to be selected by the atmospheric-pressure-range setting unit according to the present embodiment.

And, as illustrated in FIG. 16, the atmospheric-pressure-range setting unit 143a extracts atmospheric-pressure-sensor values (hereinafter referred to as peak values) 6001 to 6004 whose number of totaled individual atmospheric-pressure-sensor values, that is to say, appearance frequency of same values is higher than that of before and after the values. In the case of the present embodiment, for the peak values 6001 to 6004, 1008.85 hPa, 1008.60 hPa, 1008.40 hPa, and 1008.10 hPa are extracted as illustrated in FIG. 17.

And the atmospheric-pressure-range setting unit 143a associates the extracted peak values 6001 to 6004 in descending order with floor numbers in ascending order (S4004) in sequence, respectively. In the case of the present embodiment, by the processing of the atmospheric-pressure-range setting unit 143a, the individual peak values 6001 to 6004 and the floor numbers are associated as follows. A peak value 6001 (1008.85 hPa)—the first floor, a peak value 6002 (1008.60 hPa)—the second floor, a peak value 6003 (1008.40 hPa)—the third floor, and a peak value 6004 (1008.10 hPa)—the fourth floor.

And the atmospheric-pressure-range setting unit 143a performs atmospheric-pressure-range setting processing (FIG. 13: S4005). Specifically, the setting processing is performed as follows.

The atmospheric-pressure-range setting unit 143a calculates an interval between adjacent values of the individual peak values 6001 to 6004. In the case of the present embodiment, the interval of the peak values 6001 and 6002 is 0.25 hPa, the interval between the peak values 6002 and 6003 is 0.20 hPa, and the interval between the peak values 6003 and 6004 is 0.30 hPa.

Next, the atmospheric-pressure-range setting unit 143a calculates the average of the calculated intervals. In the case of the present embodiment, the average is 0.25 hPa.

And the atmospheric-pressure-range setting unit 143a defines this interval as atmospheric-pressure ranges 6010 to 6040 of the individual floors with peak values 6001 to 6004 as centers, respectively.

Figure 18:
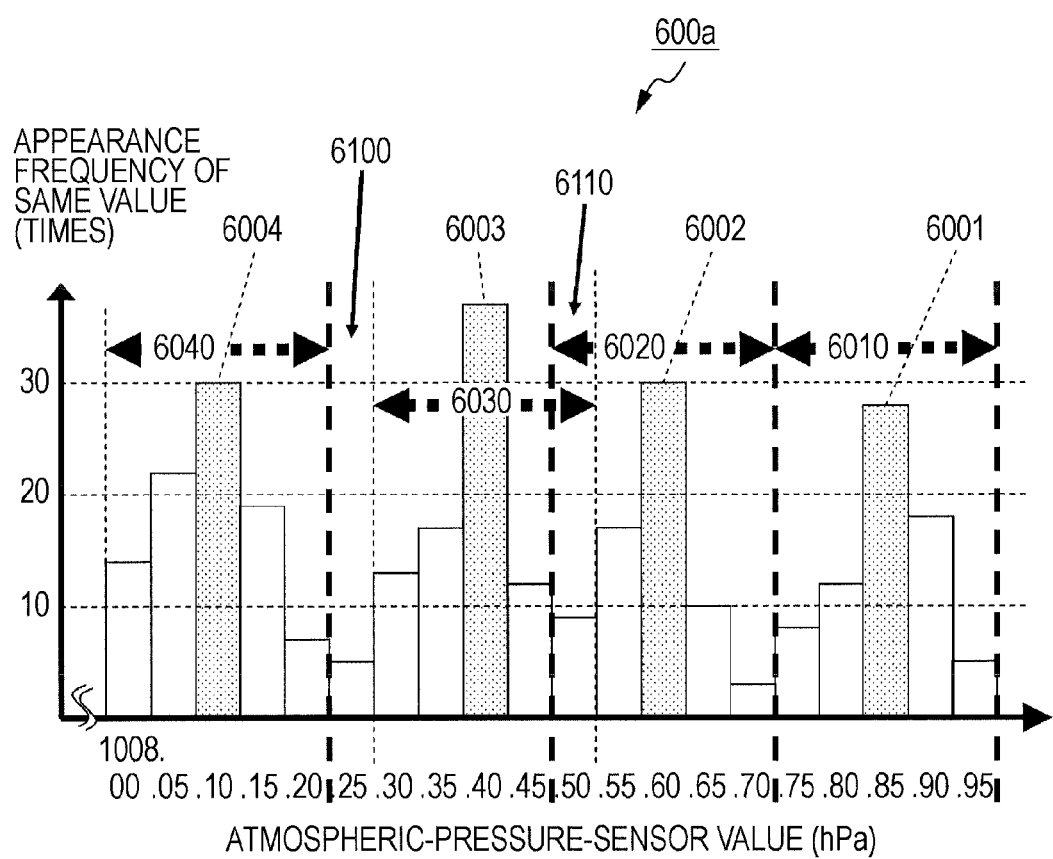
FIG. 18 is a diagram illustrating setting of atmospheric-pressure ranges by the atmospheric-pressure-range setting unit according to the present embodiment.

However, as described above, not all the intervals of the peak values 6001 to 6004 are completely uniform. Accordingly, if individual atmospheric-pressure ranges are set simply with peak values 6001 to 6004 as the centers, respectively, there arise, such as the atmospheric-pressure range 6030 in FIG. 18 that overlap the other atmospheric-pressure range 6020 (overlap at an atmospheric-pressure-sensor value 6110), or an atmospheric-pressure-sensor value 6100 not included in any one of the atmospheric-pressure ranges 6010 to 6040.

In order to handle this situation, the atmospheric-pressure-range setting unit 143a sets the atmospheric-pressure ranges such that the atmospheric-pressure ranges 6010 to 6040 do not overlap with each other continuously. At this time, the atmospheric-pressure-range setting unit 143a sets the atmospheric-pressure ranges such that atmospheric-pressure ranges 6010 to 6040 having center values as the peak values 6001 to 6004 become greatest in number.

Figure 19:
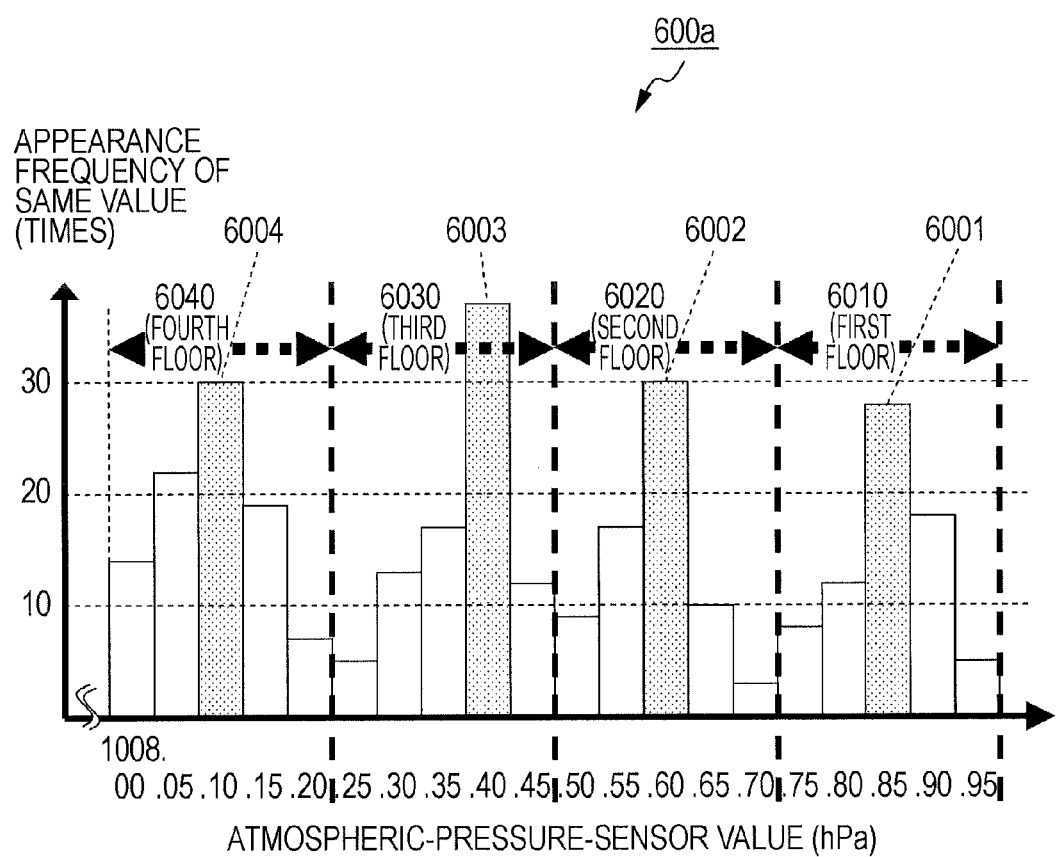
FIG. 19 is a diagram illustrating setting of atmospheric-pressure ranges by the atmospheric-pressure-range setting unit according to the present embodiment.

An example that is set in this manner is illustrated in FIG. 19. In this example, the peak values 6001, 6002, and 6004 other than the peak value 6003 are center values of the individual atmospheric-pressure ranges 6010, 6020, and 6040, respectively. The atmospheric-pressure-range setting unit 143a sets the values of the atmospheric-pressure ranges 6010 to 6040 in association with values of the individual floors, respectively.

The atmospheric-pressure-range setting unit 143a stores the association information, in which the set atmospheric-pressure ranges 6010 to 6040 and the individual floors are associated respectively as described above, into the atmospheric-pressure-range storage unit 147a as atmospheric-pressure-range information 102 (S4006).

As described above, the atmospheric-pressure-range setting unit 143a classifies atmospheric-pressure values into the atmospheric-pressure ranges 6010 to 6040.

An example of the stored atmospheric-pressure-range information 102 is illustrated in FIG. 20. As illustrated in FIG. 20, by the processing in S4006 of the atmospheric-pressure-range setting unit 143a, the upper limit 102c and the lower limit 102e of the atmospheric-pressure ranges 6010 to 6040 set in S4005 are stored for each floor number 102b of the building 102a.

In this manner, the atmospheric-pressure-range setting unit 143a that has completed the processing in S4006 in FIG. 13 determines whether location information is obtained by the processing in S4001 for all the buildings in the building-location-information storage unit 145a (S4007). If not obtained, the processing proceeds to the processing in S4001. If obtained, the processing is terminated, and the processing proceeds to the processing in S3004 in FIG. 11.

Referring back to FIG. 11, if the control unit 141a determines in S3002 that the received information is a floor-number identification request 220b, the control unit 141a instructs the floor-number identification unit 144a to perform floor-number identification processing (S3008).

In the following, a description will be given of this processing with reference to FIG. 21.

Figure 21:
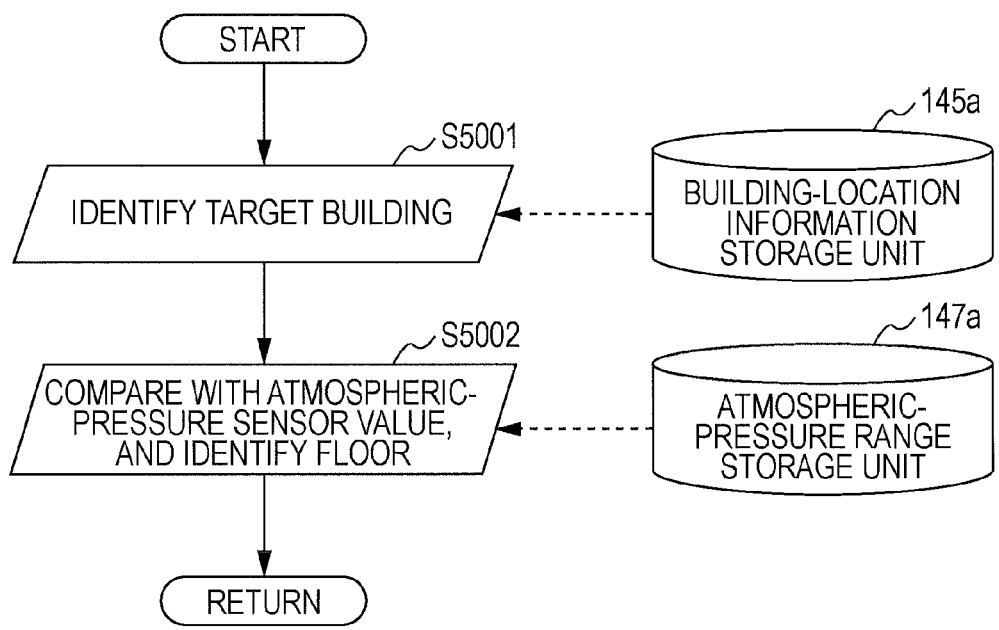
FIG. 21 is a flowchart illustrating processing by a floor-number identification unit according to the present embodiment.

First, as illustrated in FIG. 21, the floor-number identification unit 144a performs matching operation of the location information 220b4 in the floor-number identification request 220b and the building location information 101 in the building-location-information storage unit 145a in order to identify a target building (S5001).

In the case of the floor-number identification request 220b illustrated in FIG. 8, the location information 220b4 is within a range of "A building" in the building location information 101 in FIG. 15, and thus the floor-number identification unit 144a identifies "A building" as a target building.

Next, the floor-number identification unit 144a compares the atmospheric-pressure-range information 102 of the building extracted by the processing in S5001 from the atmospheric-pressure-range storage unit 147a and the atmospheric-pressure-sensor value 220b3 in the floor-number identification request 220b, and identifies a floor number (S5002).

In the case of the floor-number identification request 220b illustrated in FIG. 8, the target building has been identified as "A building" in the processing in S5001, and thus the atmospheric-pressure-sensor value 220b3 is compared with the atmospheric-pressure-range information 102 of A building illustrated in FIG. 20. Here, the atmospheric-pressure-sensor value 220b3 is included in a "fourth floor" in the atmospheric-pressure range, and thus the floor-number identification unit 144a identifies the floor number as the "fourth floor".

When the identification by the floor-number identification unit 144a is complete, the control unit 141a generates a response 110a on the basis of the identified floor number and building name. As illustrated in FIG. 9, the response 110a includes as a "floor number response" indicating that this is a response, as information type 110a1, a terminal ID 110a2 of the mobile phone 2 that has transmitted the floor-number identification request 220b, a building name 110a3 identified in S5001, and a floor number 100a4 identified in S5002. And the control unit 141a controls the communication interface 15 to transmit the generated response 110a to the mobile phone 2 that has transmitted the floor-number identification request 220b (FIG. 11: S3009).

As described above, in the present embodiment, the server 1 collects atmospheric-pressure-sensor values and location information from the individual mobile phones 2a to 2n. And the server 1 periodically generates and stores atmospheric-pressure-range information 102 on the basis of the collected information. Further, the server 1 receives a floor-number identification request 220b including an atmospheric-pressure-sensor value and location information from a certain mobile phone 2, and compares the request with the stored atmospheric-pressure-range information 102 of each building in order to identify the building and the floor number. By this configuration, in the present embodiment, it becomes possible to identify a floor number without disposing a dedicated atmospheric-pressure sensor to be a reference.

In this regard, in the present embodiment, a building is identified by location information. However, for example, in the case of an indoor-type mobile phone 2 that is not allowed to be used outside the building, the location information may not be used, and an atmospheric-pressure range may be set on the basis of the atmospheric-pressure-sensor values from all the mobile phones 2a to 2n that can be connected.

Also, in the case of company-provided mobile phones, use of the mobile phones in a specific building plays a central role. Accordingly, even if atmospheric-pressure ranges are set on the basis of atmospheric-pressure-sensor values of all the mobile phones, it is possible to identify a floor number inside a building of a target company providing the mobile phones.

Further, in the case of the present embodiment, the atmospheric-pressure ranges 6010 to 6040 are identified by the processing illustrated in FIG. 13. However, the present disclosure is not limited to this, and atmospheric-pressure ranges may set using clustering, in which given data is allowed to be classified without an external reference using, for example, the Ward's method, the K-means method, etc.

Further, in the case of the present embodiment, atmospheric-pressure ranges of each building are set and refreshed for each 10 minutes. This is because atmospheric-pressure changes at any time on the basis of weather conditions, and thus the atmospheric-pressure ranges are periodically reviewed, and thus it becomes possible to more correctly identify a floor number using atmospheric-pressure ranges on the basis of newer atmospheric-pressure-sensor values.

The interval of 10 minutes is allowed to be any time period unless there is not a great impact on the precision of the atmospheric-pressure ranges.

In this regard, the shorter this interval is, the larger the number of this processing per unit time becomes. And thus processing loads of the server 1 and the individual mobile phones 2a to 2n become larger.

On the contrary, as described above, an atmospheric pressure changes at any time, and thus the longer this interval is, the more the precision of the atmospheric-pressure-range values deteriorates. Accordingly, it is desirable to perform setting processing of atmospheric-pressure ranges by the atmospheric-pressure-range setting unit 143a using an interval in consideration of the trade-offs.

Further, in the case of the present embodiment, a floor number is simply output. However, assume that service information of each floor of a building is stored in the building-location-information storage unit 145a, for example, information associating a first floor with a foods section, and a second floor with a women's clothing section at a department store, etc., is stored. When the floor-number identification unit 144a identifies a building and a floor number, if the above information is further provided, it becomes possible to provide more useful information to the mobile phones 2a to 2n.

In this regard, by adding additional information, such as information on which floor is provided with an emergency exit, etc., to that information, in the case of evacuation, etc., it becomes possible to provide information for selecting a nearest evacuation route to the users of the mobile phones 2a to 2n.

Also, in the present embodiment, processing for identifying a floor number is performed by the server 1, which is a kind of information processing apparatus. However, the server 1 may store the atmospheric-pressure-range information 102, and may transmit the atmospheric-pressure-range information 102 to the mobile phone 2 in response to a request from the mobile phone 2. And the communication control unit 23 of the mobile phone 2 may compare the received atmospheric-pressure-range information 102 and the atmospheric-pressure-sensor value of the atmospheric-pressure sensor 27 in order to obtain information on the identified floor number.

Further, in the above-described embodiment, an identification result (response 110a) of a floor number is transmitted to the mobile phone 2 that has transmitted a floor-number identification request 220b.

However, a terminal ID 220a2 is added to the control-unit periodic notification information 220a transmitted by the communication control unit 241a of the mobile phone 2. And, as illustrated in FIG. 12, the atmospheric-pressure-sensor value storage unit 146a stores an atmospheric-pressure-sensor value 100b and the terminal ID 100a.

Accordingly, after the atmospheric-pressure-range setting unit 144a sets the atmospheric-pressure ranges 6010 to 6040, the atmospheric-pressure-range setting unit 144a refers to the atmospheric-pressure ranges 6010 to 6040 and the atmospheric-pressure-sensor value storage unit 146a, and identifies a building and a floor number on which each mobile phone 2 that has transmitted the periodic notification information 220a. And the atmospheric-pressure-range setting unit 144a stores information on a building and a floor number of the identified each mobile phone 2 into the atmospheric-pressure-sensor value storage unit 146a. And when the floor-number identification request 220b is received, the atmospheric-pressure-range setting unit 144a may refer to the atmospheric-pressure-sensor value storage unit 146a, and may transmit related information to the mobile phones 2 located on the specified floor in response to the floor-number identification request 220b. Thereby, it becomes possible to provide various services on a building, for example, if a person who has been out on a business trip returns to the office, a notification of that return may be sent to employees on that floor, etc., in addition to simply getting information on a floor number of the building.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    an obtaining unit, which is connected to a plurality of electronic devices through a network, configured to obtain an atmospheric-pressure value measured by each of the plurality of electronic devices, the plurality of electronic devices being located at the corresponding floors in a building and having atmospheric-pressure sensors, respectively;
    a setting unit configured to perform processing, the processing including
        determining a number of peak values based on an appearance frequency of the obtained plurality of atmospheric-pressure values, the number of peak values being equal to a number of floors in the building, and
        associating the peak values in descending order with floor numbers of the floors in the building in ascending order; and
    a transmission unit configured to transmit information on a floor number of the building associated with a received atmospheric-pressure value based on the associating when the atmospheric-pressure value is received together with identification information identifying the electronic device from any one of the electronic devices.

2. The information processing apparatus according to claim 1,
    wherein the transmission unit transmits information on the floor of the building on the basis of the identification information.

3. The information processing apparatus according to claim 1,
    wherein the obtaining unit obtains atmospheric-pressure values measured by the plurality of electronic devices together with identification information identifying the electronic devices, respectively,
    the setting unit associates the individual electronic devices with the corresponding floors of the building on the basis of the atmospheric-pressure values of the individual electronic devices and identification information of the corresponding electronic devices obtained by the obtaining unit and the association information, and
    the transmission unit transmits information on the floor associated with the atmospheric-pressure value to the electronic device associated with the floor of the building.

4. The information processing apparatus according to claim 1,
    wherein the setting unit generates the association information for each of a predetermined time period.

5. An information processing apparatus comprising:
    a location identification unit;
    an obtaining unit configured to obtain location information and atmospheric-pressure values of each of the electronic devices having atmospheric-pressure sensors;
    a building-location information storage unit configured to store location information for each of a plurality of buildings;
    a setting unit configured
    to determine a number of peak values based on an appearance frequency of the obtained plurality of atmospheric-pressure values for each atmospheric-pressure value associated with a building location stored in the building-location information storage unit, the number of peak values for each building being equal to a number of floors in the respective building,
    associating the peak values in descending order with floor numbers of the floors in the building in ascending order; and
    a transmission unit configured
    to refer to the building-location information storage unit, and to identify a building associated with the received location information,
    to refer to the association information of the identified building out of the generated association information, and
    to transmit the identified information on a floor number of the building associated with the received atmospheric-pressure value when an atmospheric-pressure value is received together with identification information identifying the electronic device from any one of the electronic devices.

6. The information processing apparatus according to claim 5,
    wherein the transmission unit transmits information on the floor of the building on the basis of the identification information.

7. The information processing apparatus according to claim 5,
    wherein the obtaining unit obtains the atmospheric-pressure values measured by the plurality of electronic devices together with identification information identifying the electronic devices, respectively,
    the setting unit refers to the building-location information storage unit, associates the individual electronic devices with a building from the location information obtained from the individual electronic devices, and associates the individual electronic devices with the corresponding floors of the building on the basis of the atmospheric-pressure values of the individual electronic devices, obtained by the obtaining unit, identification information of the corresponding electronic devices, and the association information, and the transmission unit transmits information on the floor of the building associated with the atmospheric-pressure value to the electronic device associated with the identified floor of the building.

8. The information processing apparatus according to claim 5,
wherein the setting unit performs atmospheric-pressure range setting processing for each predetermined time period.

9. A method of processing information by an information processing apparatus, the information processing apparatus being connected to a plurality of electronic devices located at the corresponding floors in a building and having atmospheric-pressure sensors through a network, the method comprising:
obtaining an atmospheric-pressure value measured by each of the plurality of electronic devices;
determining a number of peak values based on an appearance frequency of the obtained plurality of atmospheric-pressure values, the number of peak values being equal to a number of floors in the building, and associating the peak values with floor numbers of the floor in the building; and
transmitting, when the atmospheric-pressure value is received together with identification information identifying the electronic device from any one of the electronic devices, information on a floor number of the building associated with the received atmospheric-pressure value based on the associating.

10. A method of processing information by a computer accessible to a building-location information storage unit configured to store location information for each a plurality of buildings, the method comprising:
obtaining location information and an atmospheric-pressure value of each of the electronic devices from a plurality of electronic devices having a location identification unit and an atmospheric-pressure sensor;
determining a number of peak values based on an appearance frequency of the atmospheric-pressure values having a same value on the basis of the obtained plurality of atmospheric-pressure values for each atmospheric-pressure value associated with a building location stored in the building-location information storage unit, the number of peak values for each building being equal to a number of floors in the respective building, and associating the peak values in descending order with floor numbers of the floors in a building to be a target in ascending order,
identifying a building associated with the received location information, referring to the associating when an atmospheric-pressure value is received together with identification information identifying the electronic device from any one of the electronic devices, referring to the building-location information storage unit; and
transmitting, by a computer, the identified information on a floor number of the building associated with the received atmospheric-pressure value.

11. A non-transitory recording medium storing an information processing program causing a computer to perform processing, the computer being connected to a plurality of electronic devices located at the corresponding floors in a building and having atmospheric-pressure sensors through a network, the information processing program performing processing comprising:
obtaining an atmospheric-pressure value measured by each of the plurality of electronic devices;
determining a number of peak values based on an appearance frequency of the obtained plurality of atmospheric-pressure values, the number of peak values being equal to a number of floors in the building, and peak values in descending order with floor numbers of the floors in the building in ascending order; and
transmitting, by a computer, information on a floor number of the building associated with a received atmospheric-pressure value based on the associating when the atmospheric-pressure value is received together with identification information identifying the electronic device from any one of the electronic devices.

12. A non-transitory recording medium configured to store an information processing program causing a computer accessible to a building-location information storage unit configured to store location information for each of a plurality of buildings, the information processing program causing the computer to perform processing comprising:
obtaining location information and an atmospheric-pressure value of each of the electronic devices from a plurality of electronic devices having a location identification unit and an atmospheric-pressure sensor;
determining a number of peak values based on an appearance frequency of the obtained plurality of atmospheric-pressure values for each atmospheric-pressure value associated with a building location stored in the building-location information storage unit, the number of peak values for each building being equal to a number of floors in the respective building, and associating the peak values in descending order with floor numbers of the floors in a building to be a target in ascending order,
identifying a building associated with the received location information, referring to the associating when an atmospheric-pressure value is received together with identification information identifying the electronic device from any one of the electronic devices, referring to the building-location information storage unit; and
transmitting the identified information on a floor number of the building associated with the received atmospheric-pressure value.

13. An electronic device comprising:
a display unit;
an atmospheric-pressure sensor;
a communication unit configured to perform communication with an information processing apparatus including
a storage unit configured to obtain and store atmospheric-pressure values from a plurality of electronic devices located at the individual floors in a building with a plurality of stories and having atmospheric-pressure sensors, respectively,
an atmospheric-pressure range storage unit configured to store an atmospheric-pressure range data, and
an atmospheric-pressure range setting unit configured to perform atmospheric-pressure range setting processing storing an atmospheric-pressure range data set on the basis of a high-appearance frequency value out of the atmospheric-pressure value stored in the storage unit in association with a floor of the building into the atmospheric-pressure range storage unit, and
a control unit configured to control the communication unit to obtain the atmospheric-pressure range data stored in the atmospheric-pressure range storage unit of the information processing apparatus, and to display information on an identified floor on the display unit by comparing the obtained atmospheric-pressure range data and the atmospheric-pressure sensor value of the atmospheric-pressure sensor.

* * * * *

UNITED STATES PATENT AND TRADEMARK OFFICE
CERTIFICATE OF CORRECTION

PATENT NO.        : 8,996,313 B2
APPLICATION NO.   : 13/403453
DATED             : March 31, 2015
INVENTOR(S)       : Toru Kamiwada et al.

It is certified that error appears in the above-identified patent and that said Letters Patent is hereby corrected as shown below:

In the Claims

Column 15, line 33, In Claim 10, delete "each a" and insert -- each of a --, therefor.
Column 16, line 4, In Claim 11, before "peak" insert -- associating the --.

Signed and Sealed this
Twenty-third Day of June, 2015

Michelle K. Lee
*Director of the United States Patent and Trademark Office*